Figure 1:
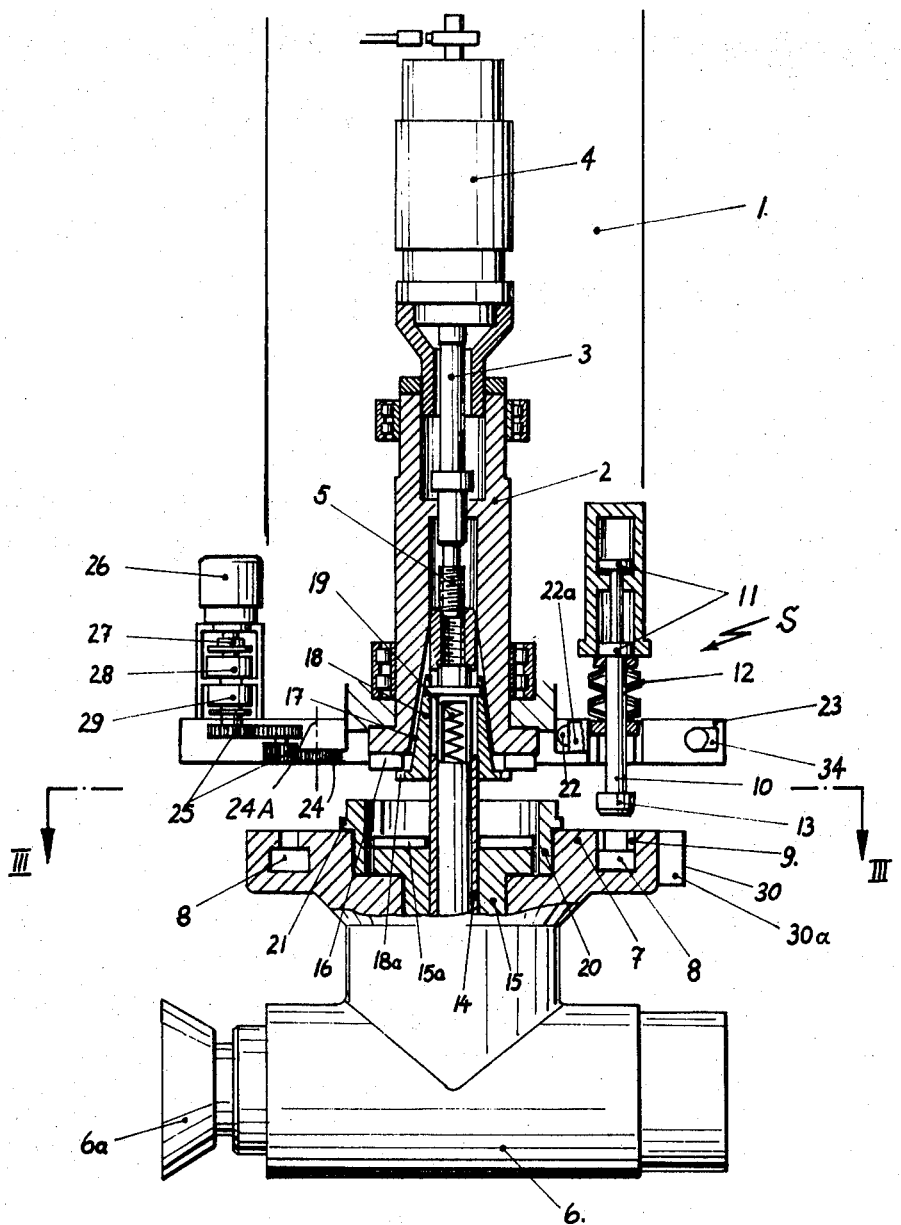

United States Patent
Eich et al.

[11] 3,757,637
[45] Sept. 11, 1973

[54] DEVICE FOR THE AUTOMATIC REPLACEMENT AND ADJUSTMENT OF TOOL CARRIERS, MORE PARTICULARLY ANGULAR MILLING HEADS ON THE MILLING SUPPORT OF A MACHINE TOOL

[76] Inventors: Edmund Eich, Sauerbruchstr. 8, Coburg; Walter Muller, Schulstr. 8, Weitramsdorf; Bruno Fritsch, joh Lindun Str. 681vt, Trenchtlingen, all of Germany

[22] Filed: Sept. 13, 1971

[21] Appl. No.: 179,783

[30] Foreign Application Priority Data
Sept. 15, 1970 Germany .................. P 20 45 604.6

[52] U.S. Cl. .................................... 90/17, 90/11 D
[51] Int. Cl. ......................... B23d 1/12, B23d 9/00
[58] Field of Search ............................ 90/11 D, 17

[56] References Cited
UNITED STATES PATENTS
2,718,820  9/1955  Faselt .................................... 90/17
2,307,222  1/1943  Johnson ................................. 90/17

Primary Examiner—Francis S. Husar
Attorney—Woodhams, Blanchard & Flynn

[57] ABSTRACT

A device for the automatic replacement and adjustment of tool carriers, such as angular milling heads on a milling support on a machine tool. A drawbar is axially slidably and rotatably mounted in the milling spindle. A base plate is provided for closing the milling support at the free end of the milling spindle. A tube is connected to the tool carrier and is secured to the free end of the drawbar. A fixing flange is provided on the tool carrier and extends parallel to the base plate. A fixing arrangement is provided between the fixing flange and the base plate for fixing the tool carrier in a predetermined angular position relative to the milling support. A plurality of clamping arrangements are mounted on the base plate and cooperate with the fixing flange.

18 Claims, 7 Drawing Figures

INVENTORS
EDMUND EICH
WALTER MÜLLER
BRUNO FRITSCH

DEVICE FOR THE AUTOMATIC REPLACEMENT AND ADJUSTMENT OF TOOL CARRIERS, MORE PARTICULARLY ANGULAR MILLING HEADS ON THE MILLING SUPPORT OF A MACHINE TOOL

The invention concerns a device for the automatic replacement and adjustment of tool carriers, more particularly angular milling heads on the milling support of a machine tool, having a drawbar mounted axially slidable and rotatable in the milling spindle and screwthreaded on its free end, a base plate closing the milling support at the free end of the milling spindle, a screwthreaded tube which is connected to the tool carrier and in which the screwthread of the drawbar is screwable, a fixing flange provided on the tool carrier parallel to the base plate, a fixing arrangement provided between the fixing flange and base plate and fixing the tool carrier in predetermined angular positions relative to the milling support, a number of clamping arrangements mounted on the base plate and co-operating with the flange, as well as a centring device between fixing flange and base plate. In modern machine tools, the tendency is to machine large workpieces in what is termed all-round machining, in which different machining operations are carried out on the workpiece in one setting. To enable this to be done, additional tool carriers such as, for example, angular milling heads, spindle extensions and the like have had to be temporarily attached. Economic use of such tool carriers, however, has been unsuccessful because the time required for mounting and dismounting, which was done by hand, was much longer than the actual machining time. With hitherto known devices, therefore, it has not been possible to carry out machining economically and meet the requirement for greater machining accuracy.

It is the object of the invention to provide a device for the automatic replacement and adjustment of tool carriers, more particularly angular milling heads on the milling support of a machine tool, whereby it is possible to mount and dismount the tool carrier in a simple manner, in a shorter time and with greater accuracy.

The device according to the invention is characterized in that a. the fixing arrangement is constructed in the manner of an indexing arrangement and is mounted on the outer periphery of the fixing flange, b. a motor-driven pinion is provided on the base plate and is rotatable about an axis parallel to the milling spindle axis and meshes with a toothed crown connected to the fixing flange, c. each clamping arrangement has a clamping pin hydraulically or pneumatically slidable parallel to the milling spindle axis and having a head on its lower end engaging a corresponding annular T-slot of the fixing flange, d. a control device is provided for the successive control of the drawbar, pinion, fixing arrangement and clamping arrangement.

This new device makes it possible to lift the tool carrier automatically by means of the drawbar provided in the milling spindle and the screwthreaded tube provided on the tool carrier, whereby the tool carrier is centred and fixed. When this has been done, the tool carrier is rigidly connected to the milling support by the hydraulically or pneumatically operated clamping arrangement. By means of the new device, the time spent in incidental operations in the machining of a workpiece is shortened considerably. Servicing and manipulation of the tool carrier are simplified and facilitated. Whereas previously two persons were necessary for mounting an angular milling head, this work can now be done by one operator. Furthermore, in automatic mounting, the risk of accident is much less in comparison with manual mounting. It is also possible to swivel the tool carrier automatically. This purpose is served by the pinion driven by means of gearing and rotatable about an axis parallel to the spindle axis, the said pinion meshing with a toothed crown connected to the fixing flange. In the various machining operations, it is necessary to swivel the angular milling head to different angular positions about the spindle axis relative to the milling support, additional small swivelling movements being necessary for the adjustment of the correct inclination (plunge) of the cutter head relative to the surface to be machined. For this purpose, the fixing arrangement is constructed in the manner of an indexing arrangement, which permits fixing of the tool carrier in a number of predetermined angular positions relative to the milling support.

Figure 2:
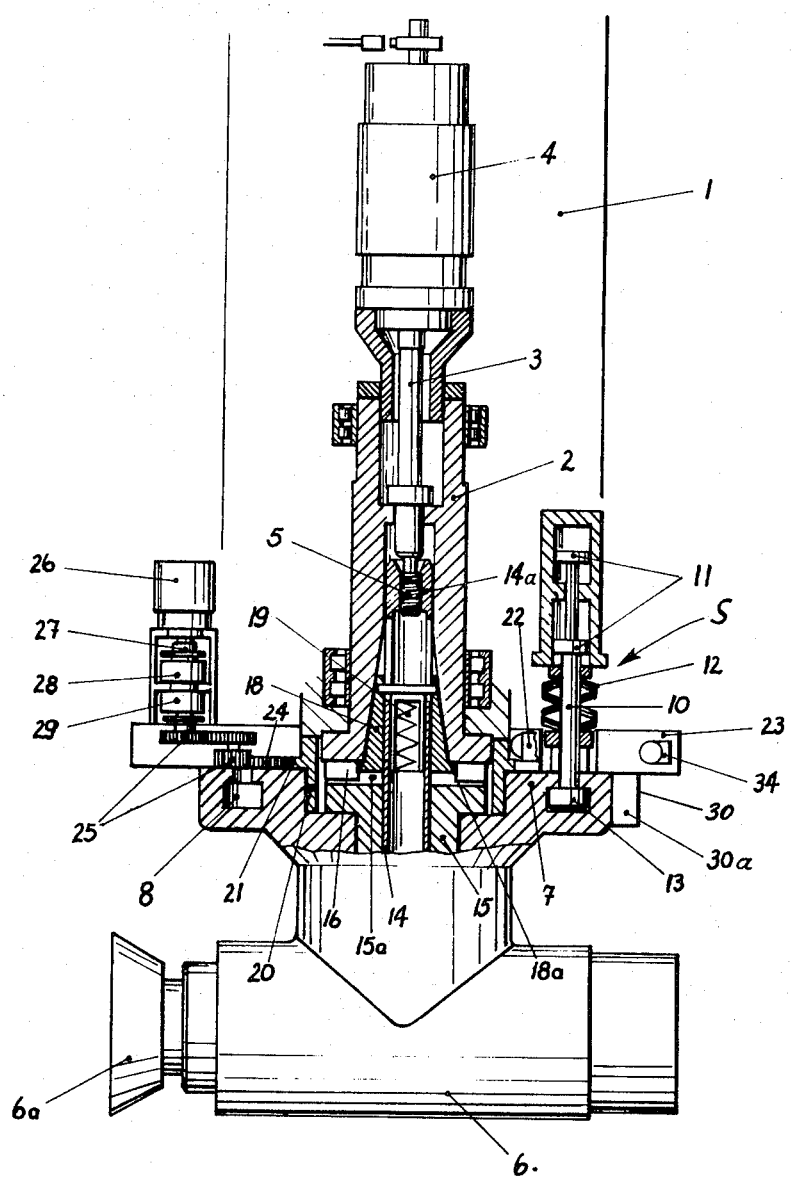
Figure 3:
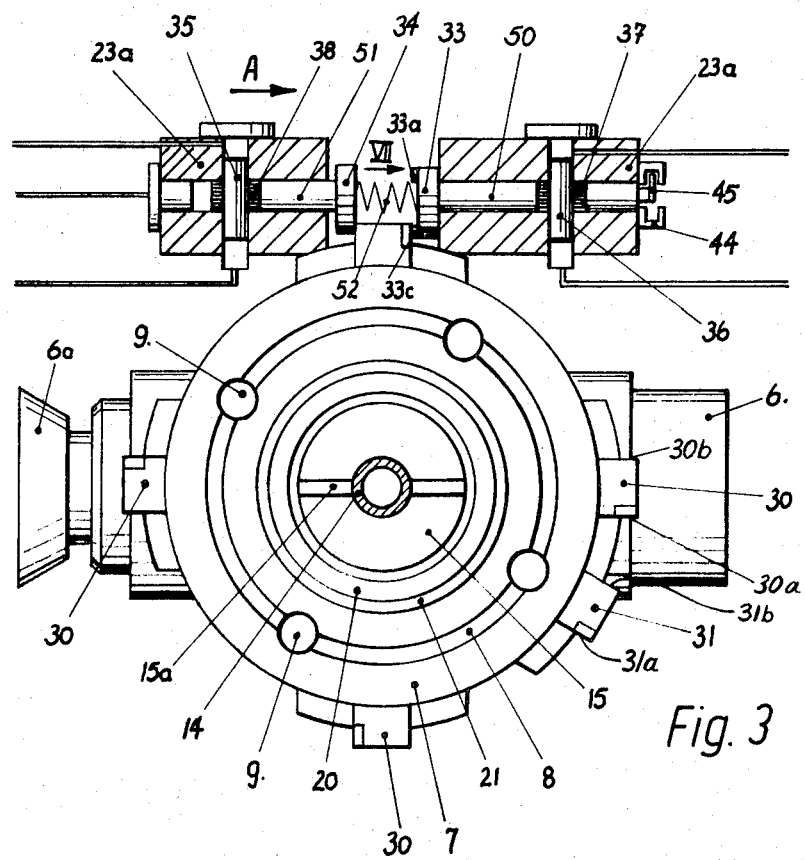
Figure 4:
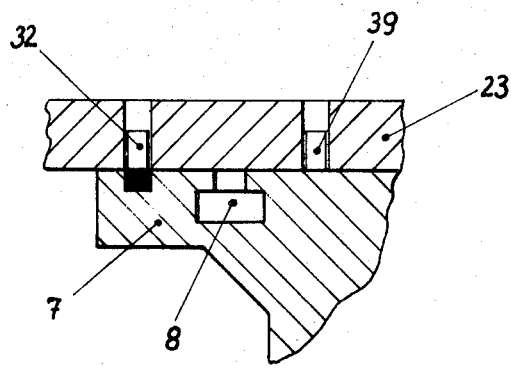
Figure 5:
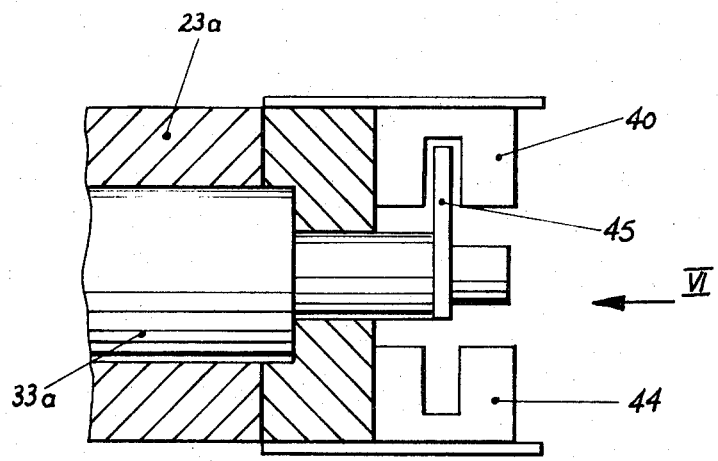
Figure 6:
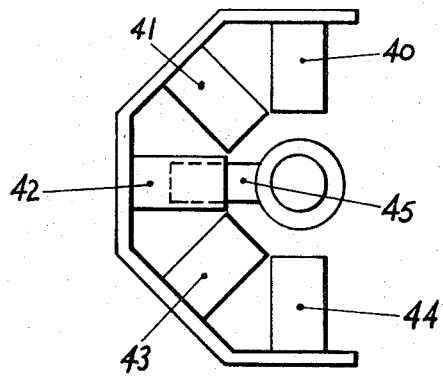
Figure 7:
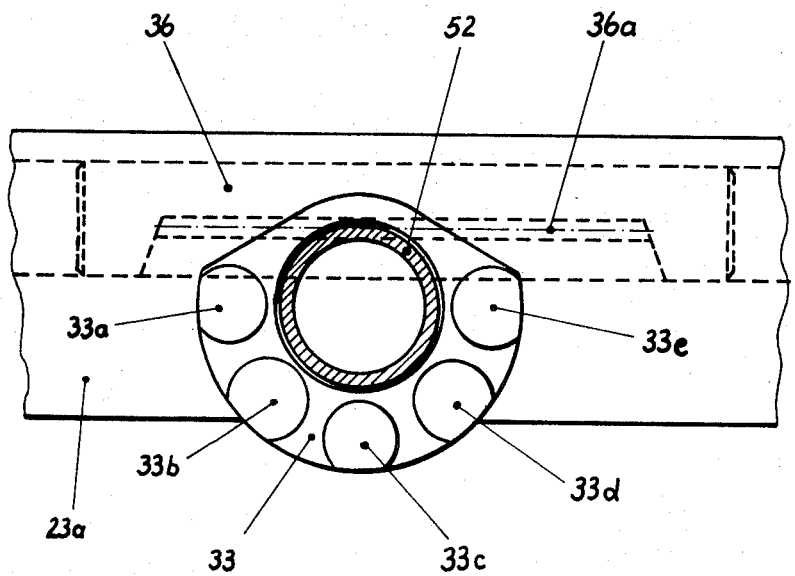

Further advantages and details of the invention are described more particularly in the following with reference to an embodiment example illustrated in the drawings, in which:

FIG. 1 shows a longitudinal section through the milling support and angular milling head with the new device in the position for mounting, FIG. 2 shows a longitudinal section through these parts in the coupled position, FIG. 3 shows a horizontal section on the line III—III of FIG. 1, FIG. 4 shows a part longitudinal section through base plate and fixing flange, FIG. 5 shows a part cross section through part of the fixing device on a larger scale, FIG. 6 shows an end view in the direction VI of FIG. 5, FIG. 7 shows an end view of one of the stops in the direction VII of FIG. 3.

Referring to the drawings, at 1 is shown the milling support, in which the milling spindle 2 is rotatably mounted. Axially slidable and rotatable inside the milling spindle 2 is the drawbar 3, adapted to be actuated by a driving motor 4, rotating together with the milling spindle. The drawbar 3 normally serves for gripping and releasing the tool shanks by means of a steep-angle cone and is known per se. The free end of the drawbar is provided with a screwthread 5, which normally is screwed into the tool shank before the actual axial movement of the drawbar takes place by means of the motor 4.

An angular milling head 6 is shown in the ready position at the lower end of the milling support 1. This angular milling head is known per se and carries the cutter head 6a. On the upper end it has a fixing flange 7 extending parallel to a base plate 23 closing the milling support.

Rigidly mounted on the angular milling head is a screwthreaded tube 14 having at its upper end an internal screwthread 14a, into which the thread 5 of the drawbar 3 is screwable. Advantageously, a centring bush 18, slidable against the force of the spring 19, may be mounted on the screwthreaded tube 14. This centring bush 18 is provided with an external conicity or taper co-operating with the receiving cone 17 of the milling spindle 2.

During the coupling operation, the centring bush 18 serves to pre-centre the screwthreaded tube 14 and to align the slots 15a, provided on the driving shaft of the angular milling head 6, relative to the driving blocks 16 on the milling spindle 2.

Alignment of the slots 15a and the driving blocks 16 is effected by means of the slots 18a in the collar of the centring bush 18, the milling spindle 2 being rotated until the driving blocks 16 engage the slots 18a, whereby the centring bush comes to bear against the internal taper of the milling spindle.

Furthermore, there are provided on the base plate 23 a number, for example four, hydraulically or pneumatically actuatable clamping arrangements S. Each of these clamping arrangements S has a clamping pin 10 slidable parallel to the milling spindle axis and provided at one end with a head 13 engaging a corresponding recess 8 of the fixing flange 7. The clamping pin is here loaded by springs, preferably cup springs, the entire clamping force being applied by the cup springs 12. For releasing the clamping device, the other end of the clamping pin 10 is in the form of a double piston 11. The disengagement force acting against the springs 12 is applied by means of high hydraulic pressure acting on the double piston 11, the clamping pins 10 being pushed downward.

To enable the angular milling head 6 to be swivelled about the spindle axis relative to the milling support 1, the recess 8 is advantageously formed as an annular T-slot, provided with holes 9 at four points. The holes 9 serves for the insertion of the heads 13 of the clamping pins 10.

For exact centring of the annular milling head, a centring ring 20 is inserted and secured in the fixing flange 7. The centring ring 20 co-operates with four ball rolling elements 22a spaced 90° apart in the base plate 23. One such ball rolling element consists of a large principal ball 22 and a number of small balls arranged in a ball bush, the principal ball 22 thus lying on a bed of small balls, capable of rolling around the entire surface of a hardened steel spherical saucer-like dish.

Practically, therefore, a ball bearing is provided consisting of small balls between the large ball and the spherical dish acting as support. The ball rolling elements are fitted radially in the base plate 23, so that even in the case of a hot milling support and a cold angular milling head they perform centring with sufficient preliminary stress, the expansion of the centring device produced by the heating of the angular milling head being taken up by the elastic deformation of the spherical bushes.

Advantageously, the centring ring 20 may also be provided with a toothed crown 21 co-operating with a pinion 24, which is rotatable about an axis parallel to the spindle axis. To prevent the pinion 24 from being damaged during mounting, it may be slidable in the axial direction along axis 24A. The pinion is driven off an adjusting motor 26 through a cyclogear 27, an electromagnetic clutch 28, an electromagnetic brake 29 and gearing 25. The control of the adjusting motor 26, electromagnetic clutch 28 and electromagnetic brake 29 is produced by means of the limit switches 32 and 39, described more particularly later.

In the case of angular milling heads, the latter must be fixed relative to the milling support in certain angular positions around the spindle axis. It is assumed that in the embodiment example shown, the angular milling head is to be fixed in four positions spaced apart by 90°. For this purpose, as fixing arrangement, four fixed stop bars 30 are arranged on the outer periphery of the flange 7, being spaced apart by 90°. Another stop bar 31 defines the position of the angular milling head on mounting and dismounting. Two rotatable stop pins 50 and 51 are mounted in the housing 23a rigidly secured to the base plate 23. On their mutually facing ends, these stop pins 50 and 51 each have a stop 33 and 34, respectively. These stops 33 and 34 co-operate with the stop bars 30, 31. To enable the angular milling head 6 to be swivelled, the stops 33,34 can be brought out of the path of movement of the stop bars 30,31 by rotation of the stop pins 50,51 on their axes. For rotating the stop pins 50,51, the latter are each provided with a pinion 37,38 meshing with a rack (only the rack 36a (FIG. 7) is illustrated) on each of the pistons 35 and 36 which are adapted to slide transversely of the pins 50,51 by means of hydraulic pistons pressure. Whereas the stop pin 50 with the stop 33 is immovable in the axial direction, the stop pin 51 can be moved hydraulically in the direction A. A spring 52 is provided for movement in the opposite direction. By the movement of the stop pin 51 in the direction A, one of the stop bars 30,31 can always be clamped fast between the two stops 33,34, thereby fixing the angular milling head in its angular position.

For plunge positioning of the cutter, the axially immovable stop 33 has a number of different fixing positions, five in the example shown. These fixing positions are determined by axially offset stop faces 33a – 33e. The middle stop face 33c is the zero position. The two adjacent stop faces on either side 33a,33b and 33d,33e correspond to two plus or minus corrected positions. Rotation of the stop pin 50 on its axis by means of the hydraulic piston 36 brings one of the stop faces 33a – 33e into the path of movement of the stop bars 30,31. The rotary position of the stop pin 50 is here determined by means of limit switches 40 to 44, adapted to be switched on from the control panel and co-operating with a switch arm 45 connected to the free end of the stop pin. The stop pin 50 always rotates until the switch arm has reached the limit switch switched on from the control panel. In this way, one of the stop faces 33a – 33e is always used, whereby a greater or lesser angular variation is adjusted relative to the exact nominal angular position of the angular milling head. By this means, an inclination of the cutting surface to the workpiece surface to be machined is obtained. This plunge adjustment is necessary for compensating a certain flexibility of the milling spindle in order to obtain optimum cutting conditions and surface quality. The plunge adjustment must be reversible in accordance with the direction of the table movement, and for that reason the adjustment of the stop 33, corrected according to plus or minus, has been provided.

The mode of operation of the new device is as follows:

For mounting the angular milling head, the latter is set on the table and brought into a position below the milling support such that the milling spindle and the screwthreaded tube 14 are more or less in alignment. By downward movement of the milling support, the milling spindle 2 is pushed over the screwthreaded tube. By switching on the driving motor 4, the drawbar 3 together with the angular milling head 6 is then drawn up until the driving blocks 16 bear against the collar of the centring bush 18, the centring cone 18 being pressed down against the spring. The milling motor is switched on and allows the milling spindle 2 to rotate slowly for a short time until the driving blocks 16 engage the slots 18a in the collar of the centring cone 18. The driving blocks 16 are then in line with the slots 15a in the driving shaft 15 of the angular milling head.

The centring bush 18 bears against the receiving cone 17, whereby mutual centring of the parts is effected. The angular milling head is then drawn up further by the drawbar 3, the centring ring 20 now coming between the balls 22 of the four radially arranged ball rolling elements 22a and exact centring being accomplished. At the same time, the heads 13 of the clamping pins 10 pass through the holes 9 in the annular slot 8, the clamping pins being pressed down hydraulically against the force of the spring 12. According to the desired angular position of the angular milling head 6, one of the limit switches 32 (FIG. 4) is switched on at the control panel. Furthermore, by operation of one of the limit switches 40 – 44, the desired inclined position of the cutter is preselected. Then, by means of the adjusting motor 26 and clutch 28, the pinion 24 is driven and the angular milling head is set in swivelling movement. When a particular 90° position is reached, this is indicated by means of the switched-on limit switch 32, the adjusting motor 26 being thereby switched off, the clutch 28 is disengaged and the brake 29 is set in operation. The stop bar 30 concerned is then in the vicinity of or bearing against one of the stop faces 33a – 33e corresponding to the preselected plunge position. By the action of the hydraulic piston 35, the stop 34 is swung into the path of movement of the stop bar 30 and the stop pin 51 is shifted in the direction A. The stop bar 30 is thereby pressed against the stop face 33a – 33e switched on at the time and the angular milling head is thus fixed in the desired angular position. This having been accomplished, the pistons 11 of the clamping pins 10 are relieved of load. The cup springs 12 move the clamping pins 10 upward and bring their heads 13 to bear in the annular T-slot 8. The angular milling head is thereby securely connected to the milling support, independently of external factors.

Swivelling of the angular milling head into another position can take place in a similar manner after release of the clamping pins and movement of the stops 33,34 out of the path of movement of the stop bars 30.

For dismounting the angular milling head, the stop bar 31 is brought to bear against the stop 33 by means of another limit switch 39 mounted in the base plate. The clamping pins are then again in line with the holes 9 and the angular milling head can be lowered by operation of the drawbar 3.

The individual working operations necessary for the automatic mounting and dismounting of the tool carrier can be controlled and supervised electronically. Such electronic sequence controls are known in principle and therefore will not be discussed in greater detail here.

We claim:

1. In combination with a machine tool support having a rotatable spindle, an axially movable and rotatably movable drawbar mounted on said spindle and adapted for movement relative thereto between extended and retracted positions, a base plate on said support extending generally perpendicular to the axis of rotation of said spindle, tool carrier means having a tool thereon and connecting means for connecting said tool carrier means to said drawbar for movement toward and away from said base plate in response to extending and retracting movements of said drawbar, said tool carrier means having a mounting flange thereon parallel to said base plate when said connecting means couples said tool carrier means to said drawbar, adjusting and clamping apparatus, comprising:

indexing means for selectively fixing the position of said mounting flange relative to said base plate;

rotary driven means for driving said tool carrier means and said mounting flange for rotation about an axis parallel to said axis of rotation of said spindle between said selectively fixed positions; and clamping means for clamping said mounting flange to said base plate in one of said selectively fixed positions.

2. The combination according to claim 1, wherein said indexing means includes indexing surfaces on said mounting flange and stop means cooperable with said indexing surfaces, said stop means comprising driven stop members supported for movement into and out of the path of movement of said indexing surfaces.

3. The combination according to claim 2, wherein said rotary driven means includes a driven pinion rotatable about an axis parallel to said axis of rotation of said spindle, gear teeth on said mounting flange engageable with said driven pinion to drive said tool carrier means.

4. The combination according to claim 3, including means for supporting said driven pinion for movement in an axial direction.

5. The combination according to claim 3, wherein said driven pinion includes an adjusting motor having an output shaft, an electromagnetic clutch secured to said output shaft and a brake for controlling the output from said electromagnetic clutch.

6. The combination according to claim 3, wherein said clamping means comprises at least one clamping bolt supported for movement parallel to said axis of rotation of said spindle, said clamping bolt having an enlarged head thereon, said mounting flange having an annular inverted T-shaped groove therein having a vertical stem portion and a horizontal crossbar portion and at least one enlarged portion adapted to receive said enlarged head on said bolt so that said enlarged head is movable beneath the stem portion to said crossbar portion of said T-shaped groove and subsequently out of communication with said enlarged portion of said slot upon a rotary movement of said mounting flange.

7. The combination according to claim 5, including limit switch means for controlling the operation of said adjusting motor in relation to the position of said mounting flange to said base plate.

8. The combination according to claim 6, wherein said connecting means comprises first thread means on said drawbar and second thread means on said tool carrier means cooperable with said first thread means for coupling said tool carrier means to said support.

9. The combination according to claim 8, wherein said tool carrier means includes a rotatably supported drive shaft for driving said tool;

wherein said second thread means is on said drive shaft.

10. The combination according to claim 9, including centering means for centering said mounting flange relative to said base plate and said spindle.

11. The combination according to claim 9, wherein said spindle is hollow; and wherein said drive shaft has a centering sleeve mounted thereon for axial movement against the force of a spring, said centering sleeve having an outer conical surface thereon, said spindle having means defining a receiving cone on the interior thereof and is adapted to receive said centering sleeve upon an axial movement of said drawbar.

12. The combination according to claim 10, wherein said centering means comprises a centering ring on said mounting flange concentrically arranged about the axis of rotation of said drive shaft and at least three ball elements mounted on said base plate concentrically about the axis of said spindle, said ball elements being movable radially to accommodate said centering ring therebetween to thereby center same with respect to said axis of rotation of said spindle.

13. The combination according to claim 10, wherein said gear teeth are provided on said centering ring which is fixedly connected to said mounting flange.

14. The combination according to claim 2, wherein said indexing surfaces are defined by the laterally opposite sides of said projections extending radially outwardly from said mounting flange; and wherein said stop members are adapted to engage said indexing surfaces to clamp said projections therebetween.

15. The combination according to claim 14, wherein at least one of said stop members includes an axially movable and rotatable first stop bolt and axially fixed and rotatable second stop bolt, said first and second stop bolts including projections thereon for engaging said indexing surfaces, said projection on said axially movable stop bolt being adapted to engage a projection on mounting flange to push same against the projection on said second stop bolt.

16. The combination according to claim 15, wherein said second bolt has a plurality of axially offset surfaces thereon facing said first stop bolt, a plurality of limit switch means equal in number to said offset surfaces;

a switch arm secured to and rotatable with said second stop bolt and adapted to cooperate and actuate said limit switch means;

first drive means for rotating said second stop bolt and being controlled by said limit switch means operable in response to said switch arm.

17. The combination according to claim 16, wherein said second stop bolt has a pinion thereon and rotatable therewith;

wherein said first drive means comprises a fluid operated piston having a rack thereon engageable with said pinion and adapted to rotate said pinion upon an application of a fluid pressure to one side of said piston.

18. The combination according to claim 17, wherein said first stop bolt has a pinion thereon and rotatable therewith; and including second drive means comprising a fluid operated second piston having a rack thereon engageable with said pinion on said first stop bolt to rotate same upon an application of a fluid pressure to one side of said second piston.

* * * * *